US006523596B1

(12) United States Patent
Mullet et al.

(10) Patent No.: US 6,523,596 B1
(45) Date of Patent: Feb. 25, 2003

(54) APPARATUS FOR MANUFACTURING A FLEXIBLE CURTAIN

(75) Inventors: Willis Jay Mullet, Gulf Breeze, FL (US); Donald Bruce Kyle, Pace, FL (US); Kelly Ray Green, Pace, FL (US); Harry Edward Asbury, Gulf Breeze, FL (US)

(73) Assignee: Wayne-Dalton Corporation, Mt. Hope, OH (US)

( * ) Notice: Subject to any disclaimer, the term of this patent is extended or adjusted under 35 U.S.C. 154(b) by 69 days.

(21) Appl. No.: 09/644,926

(22) Filed: Aug. 23, 2000

(51) Int. Cl.[7] ................................................ B32B 31/20

(52) U.S. Cl. ...................... 156/553; 156/73.1; 156/253; 156/299; 156/510; 156/555; 156/581

(58) Field of Search .............................. 156/73.1, 73.5, 156/91, 93, 148, 250, 252, 253, 290, 292, 297, 299, 302, 303, 324, 510, 544, 555, 580, 581, 582, 553; 492/30

(56) References Cited

U.S. PATENT DOCUMENTS

| | | | | | |
|---|---|---|---|---|---|
| 3,158,181 | A | * | 11/1964 | Gore | 138/168 |
| 4,398,989 | A | * | 8/1983 | Allen et al. | 156/245 |
| 4,769,106 | A | * | 9/1988 | Busching | 100/222 |
| 4,990,080 | A | * | 2/1991 | Kakimoto | 425/290 |
| 5,198,281 | A | * | 3/1993 | Muzzy et al. | 156/148 |
| 5,464,497 | A | * | 11/1995 | Unthank | 156/265 |
| 5,516,386 | A | * | 5/1996 | Savarese | 156/210 |
| 5,682,618 | A | * | 11/1997 | Johnson et al. | 2/275 |
| 6,164,357 | A | * | 12/2000 | Ochi et al. | 118/213 |
| 6,357,504 | B1 | * | 3/2002 | Patel et al. | 156/499 |

FOREIGN PATENT DOCUMENTS

| | | | |
|---|---|---|---|
| WO | WO 98/49877 | * 11/1998 | H05K/3/46 |

* cited by examiner

*Primary Examiner*—Michael W. Ball
*Assistant Examiner*—Jessica Rossi
(74) *Attorney, Agent, or Firm*—Woodling, Krost & Rust

(57) ABSTRACT

A method and apparatus for manufacturing a flexible curtain as disclosed and claimed. Edges of a polymeric material are folded back on themselves. A portion of the edges are secured and a portion is left unsecured or free. The flexible curtain is used in a windlocking apparatus to prevent the unwanted intrusion of wind, water and debris into a building opening. The free, or unsecured flap of the folded edge absorbs shock associated with storm disturbances. Edge rollers are used to laminate the edges of the curtains selectively such that only a portion of the edge is secured leaving the flap unsecured. Stitching, ultrasonic welding and gluing are alternative ways and/or additional ways of providing for the securement of a portion of the edge to itself. Perforations are made in the secured portion of the folded edge.

7 Claims, 15 Drawing Sheets

APPARATUS FOR MANUFACTURING A FLEXIBLE CURTAIN

FILED OF THE INVENTION

This invention is a method and apparatus for making a windlocking curtain.

BACKGROUND OF THE INVENTION

During hurricanes and other high wind velocity storms, the breach of a building opening can cause great damage to the structure. We have a co-pending application Ser. No. 09/520,845 filed Mar. 8, 2000, now U.S. Pat. No. 6,296,039, which addresses the use of the windlocking curtain in storm conditions. This invention discloses and claims the method and apparatus for making the windlocking curtain.

SUMMARY OF THE INVENTION

A method for manufacturing a three-ply flexible curtain is disclosed. Two of the plys are polymeric and one is a woven substrate which resides between the two polymeric plies. A first and second laminating roll under the force of pressure and heat secures the three plys together. A plurality of beveled rollers fold the edges of the three ply construction back upon itself.

A first and second edge roller are used to laminate the folded edge to itself. The second edge roller has a notch which limits the extent of the lamination because the notched area on the second edge roller does not allow compression of the folded edge. Lack of compression of the folded edge in the notched area results in a loose flap which is useful in the application of the flexible curtain for absorbing shock during transient (storm) conditions. Alternatively, and/or additionally, the secured portion of the folded edge may be glued, stitched or welded.

Perforations are made in the folded edges of the curtain. Rotary, stationary or indexing punches and dies may be used.

It is an object of this invention to produce a flexible curtain having a folded edge which is partially secured to itself and which is partially unsecured.

It is a further object of this invention to produce a flexible curtain having a folded edge which has perforations therethrough where the edge is partially secured to itself.

It is a further object of this invention to produce a flexible curtain having a folded edge which has a loose, or free, flap capable of absorbing energy.

It is a further object of this invention to use a first edge roller and a second edge roller to partially laminate the folded edges of the flexible curtain.

It is a further object of this invention to fold the edges of a flexible curtain so that they may be partially laminated, glued, stitched or welded together.

It is a further object of this invention to laminate two plys of polymeric material to a woven substrate residing therebetween.

Other objects of this invention will become apparent when the drawing figures, the description of the invention and the claims are considered which follow hereinbelow.

BRIEF DESCRIPTION OF THE DRAWINGS

FIG. 3A also illustrates the notch in the second roller.

A better understanding of the invention will be had when reference is made to the description of the invention and the claims which follow hereinbelow.

DESCRIPTION OF THE INVENTION

Figure 1:
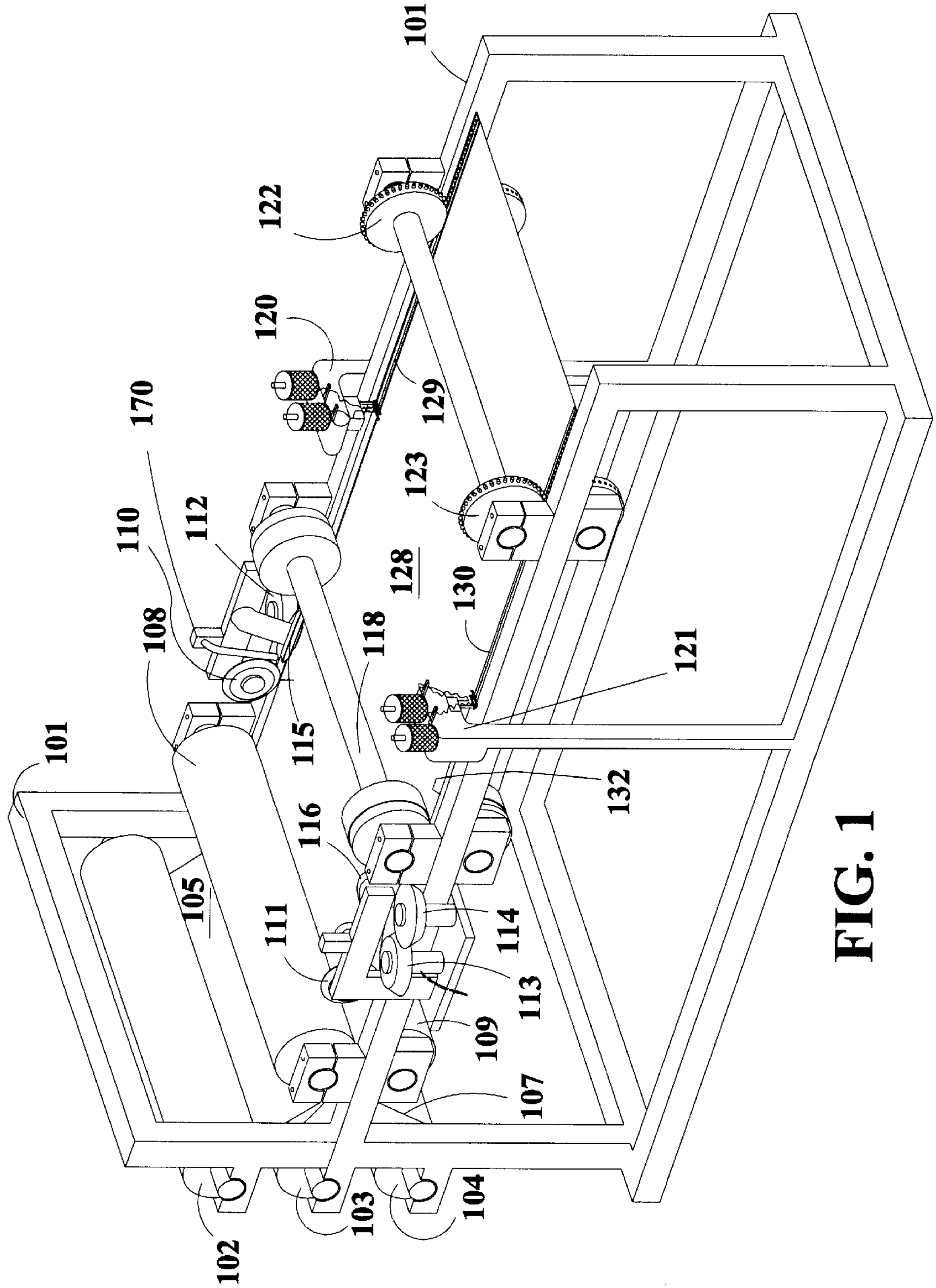
FIG. 1 is a perspective view of the invention illustrating, among other things, the laminating rollers, the edge rollers, and the perforating rollers.
Figure 1A:
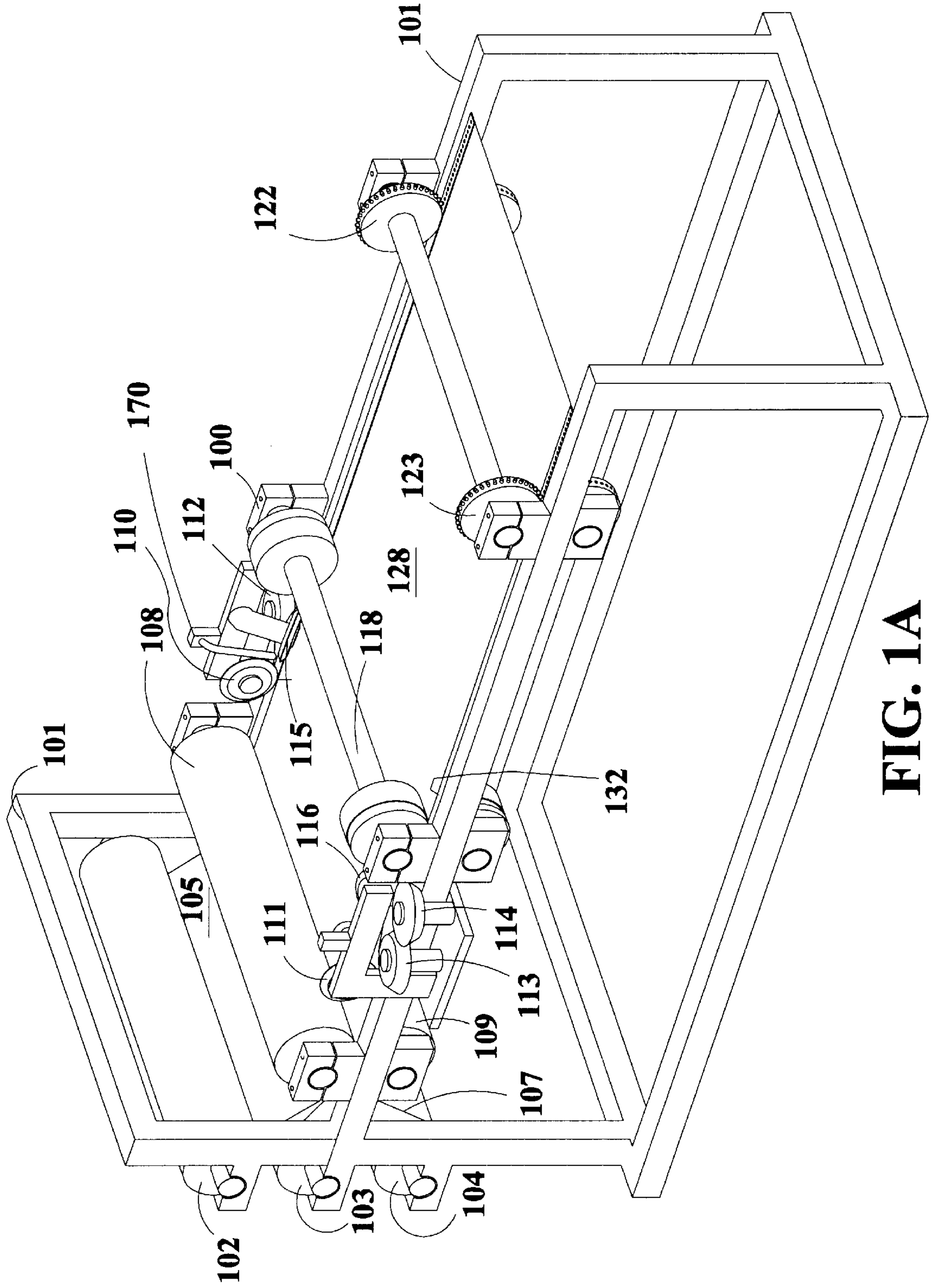
FIG. 1A is a perspective view similar to FIG. 1 without the stitching apparatus.

FIG. 1 is a perspective view of the invention illustrating, among other things, the laminating rollers 108, 109 the edge rollers and the perforating rollers. FIG. 1A is a perspective view similar to FIG. 1 without the stitching apparatus 120, 121. The stitching apparatus 120, 121 shown in FIG. 1 ensures that the folded edge 132 is affixed completely to the flexible curtain 128. Lamination alone of the edge 132 to the flexible curtain 128 is sufficient to attach the edge to the curtain. Stitching 120, 121, gluing 170 or welding 405, 406 (see, FIG. 4A) are additional methods of ensuring that the folded edge 132 is completely affixed to the flexible curtain.

Figure 2:
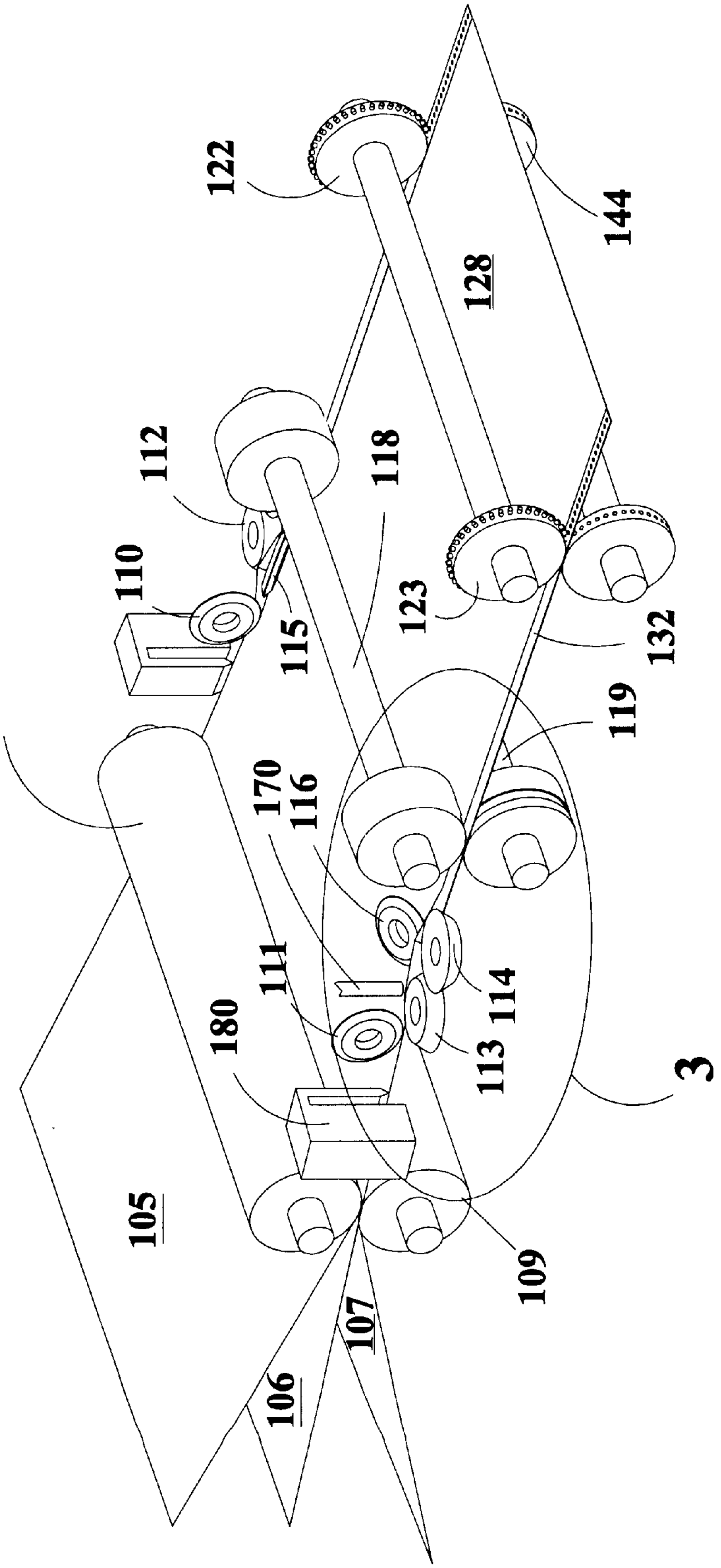
FIG. 2 is a view illustrating much of the same structure as FIG. 1 only supports are not shown in this view.

Referring to FIGS. 1 and 1A, reference numeral 101 represents the frame which positions the equipment for performing the method. First roll 102 has first polymeric material 105 wound therearound. Second roll 103 has woven sheet 106 wound therearound. Third roll 104 has second polymeric material 107 wound therearound. First and second polymeric sheets 105, 107 are laminated to the woven sheet 106 and to each other by the first laminating roll 108 and the second laminating roll 109. The three sheets 105, 106 and 107 are best viewed in FIG. 2 which is a view illustrating much of the same structure as FIG. 1 only the supporting frame 101 and structure are not shown. FIG. 2 also illustrates a slitter 180 which controls the width of the laminated curtain prior to folding of the edges.

Figure 3:
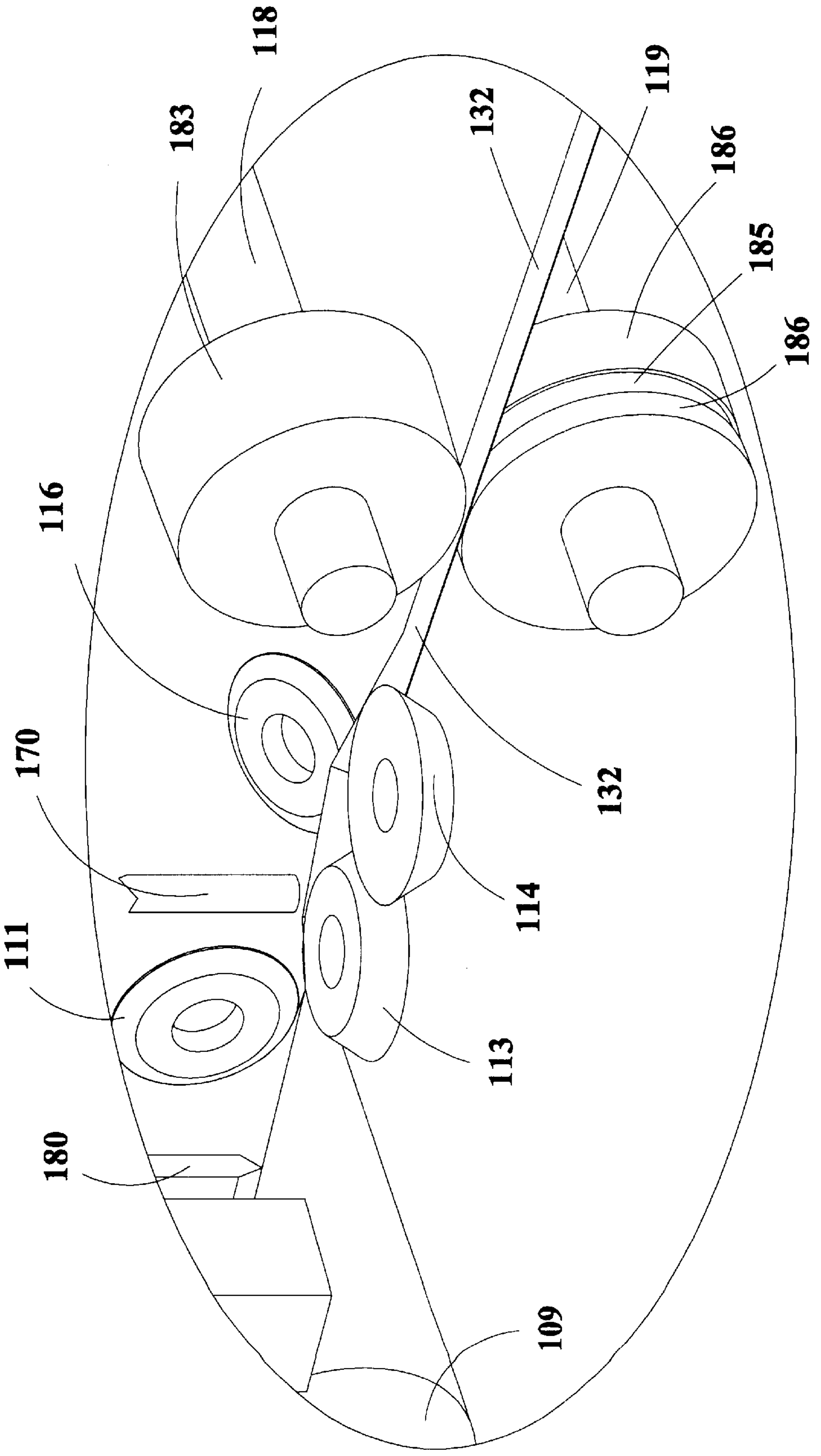
FIG. 3 is an enlarged portion of FIG. 2.

Referring to FIG. 3, which is an enlarged portion of FIG. 2, one set of beveled rollers 111 (first), 113 (second), 114 (third) and 116 (fourth) are illustrated. The other set of beveled rollers 110, 112, 113 are also viewed in FIGS. 1, 1A and 2. There are four beveled rollers on the far side but only three are visible in these perspective views.

Figure 1B:
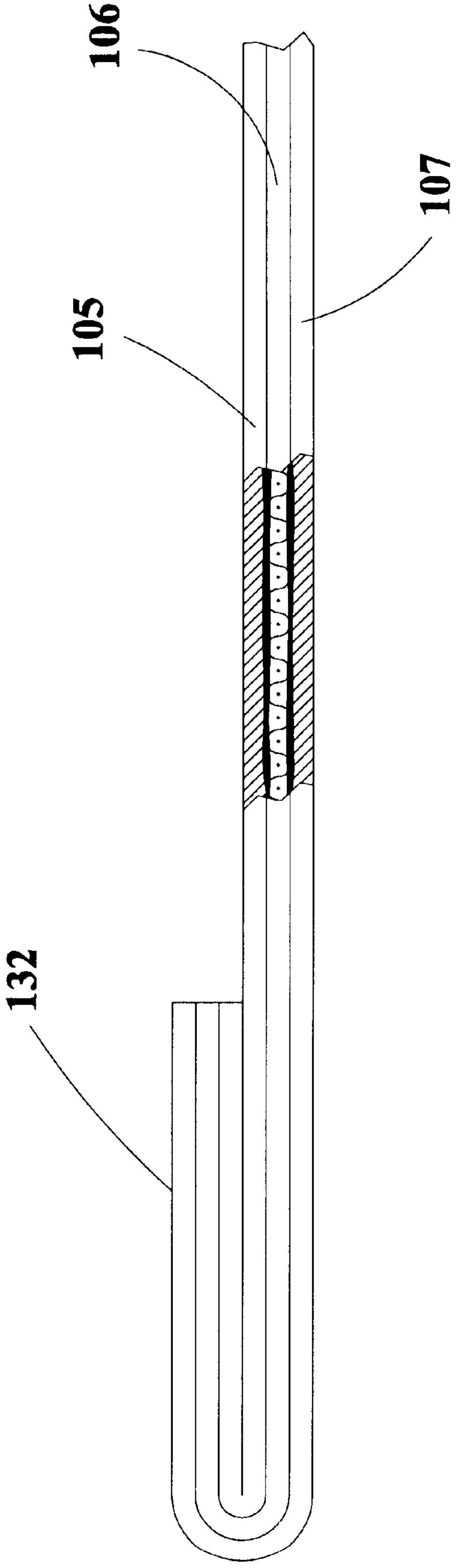
FIG. 1B is a partial cross-sectional view of the flexible curtain illustrating a folded edge.

Referring to FIGS. 2 and 3, first beveled roller 111 and second beveled roller 113 begin to turn the edge of the flexible curtain 128 vertically upward. Third beveled roller 116 in combination with second beveled roller 113 begin to fold the flexible curtain inwardly on itself. Fourth beveled roller 114 completes the fold. Although the flexible curtain is folded leaving fourth beveled roller 114, it is not laminated upon itself at this point. FIG. 1B is an illustration of the curtain and an edge 132 folded upon itself but not laminated.

Figure 3A:
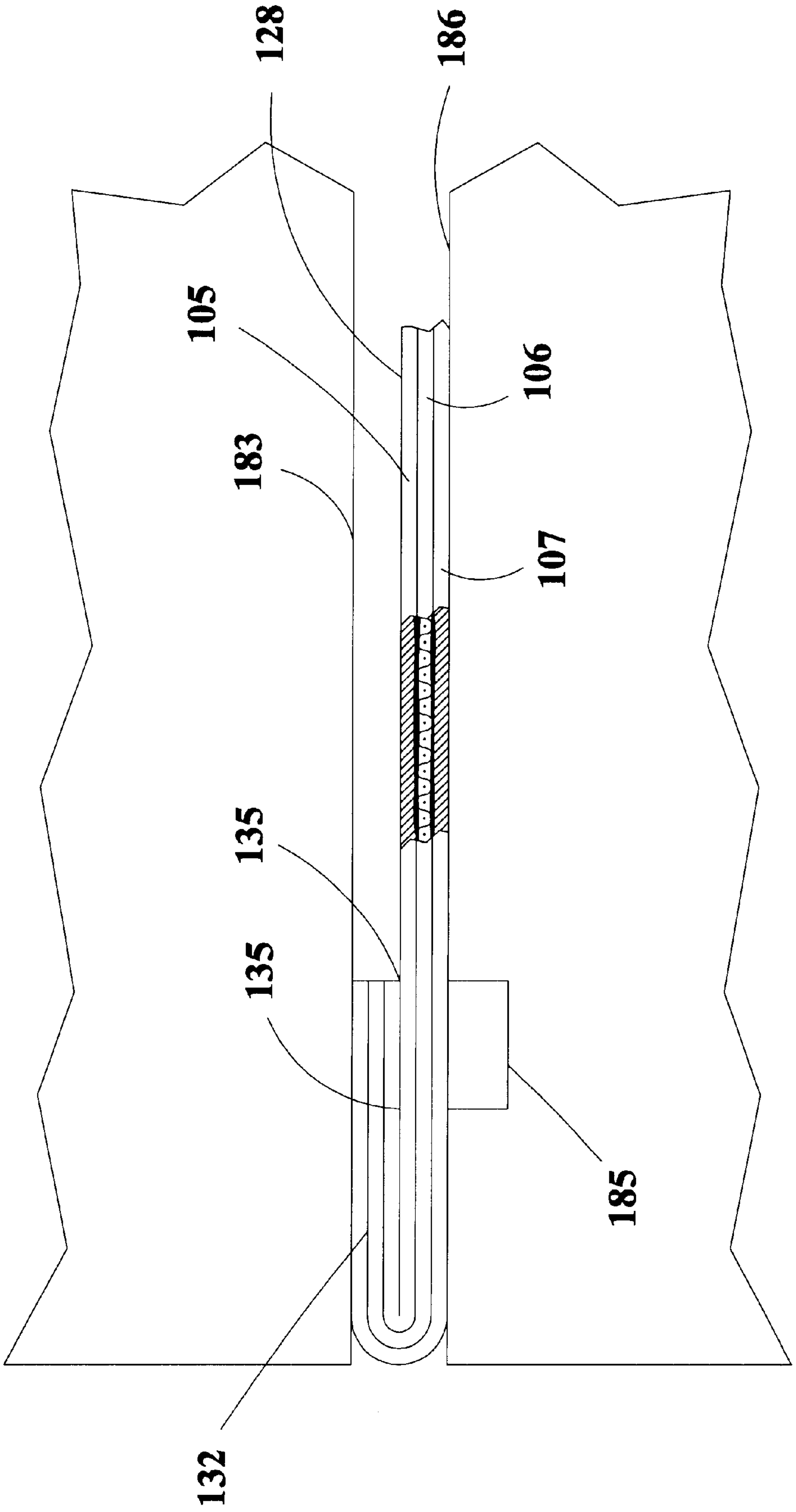
FIG. 3A is an illustration of one edge of the curtain between the first edge roller and the second edge roller.

Folded edge 132 next passes through first edge roller 118 and second edge roller 119. Referring to FIGS. 3 and 3A, first edge roller 118 includes an enlarged end portion 183 which is cylindrically shaped and has a constant diameter. Second edge roller 119 includes an enlarged edge portion 186 which is cylindrically shaped and has a circumferential notch therein. Circumferential notch 185 is a circumferential notch in cylindrical end portion 186 of edge roller 119. As folded edge 132 passes through end portions 183 and 186 of edge rollers 118, 119 it is compressed and laminated except for the portion proximal to notch 185. The function of the circumferential notch 185 is to prevent lamination of the folded edge portion 132 of the flexible curtain proximal (i.e. near) the notch. Reference numeral 135 indicates the extent of the folded edge 132 which is not laminated. See, FIG. 3A.

Figure 8:
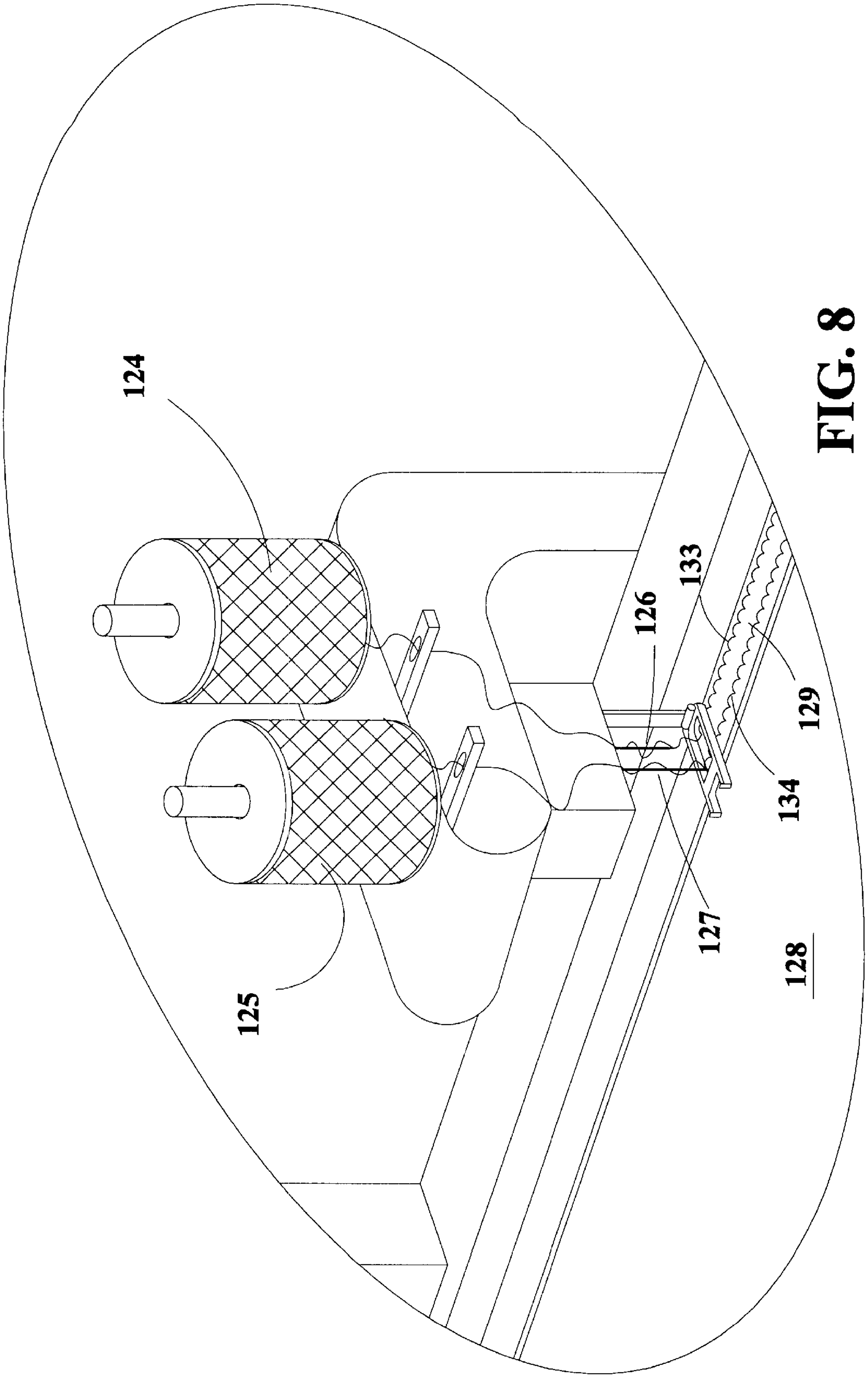
FIG. 8 is an enlargement of a portion of FIG. 1 illustrating the stitching apparatus.

FIG. 1A represents the preferred embodiment of the invention. Stitching apparatus 120, 121 may be employed to reinforce the attachment of the folded edge 132 to the flexible curtain 128. A stitching apparatus 120 can be seen in more detail by referring to FIG. 8, an enlargement of a portion of FIG. 1. FIG. 8 illustrates thread 124, 125 needles 126, 127, and stitching 133, 134. Another method of reinforcing the bond between the folded edge 132 and the flexible curtain 128 is to apply adhesive with an applicator 170 prior to completion of the folding of the edge as best seen in FIGS. 1, 2 and 3. Still referring to FIG. 8, reference numeral 129 indicates the area of the folded edge secured by the stitching. Referring to FIG. 1, stitching is indicated by reference numerals 129 and 130. Stitching may be used in addition to lamination. When the flexible curtain produced by this invention is used to protect building openings, great force will be exerted on the portion of the folded edge secured to itself. Redundant securement of the folded edge can also be effected by ultrasonic welding 405, 406 (FIG. 4A).

Figure 4:
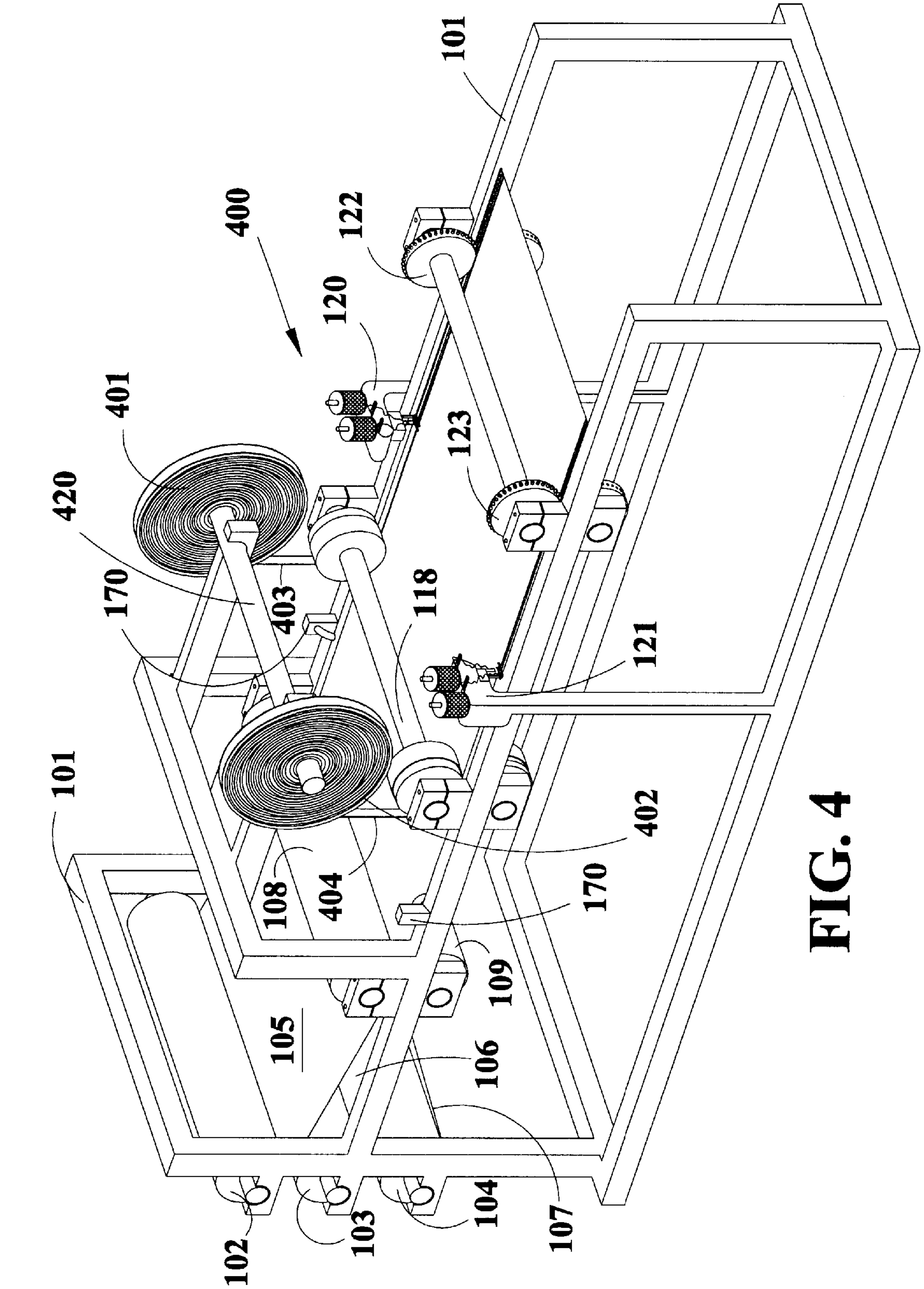
FIG. 4 is another embodiment of the invention illustrating strips applied to the edges of the curtain.
Figure 4A:
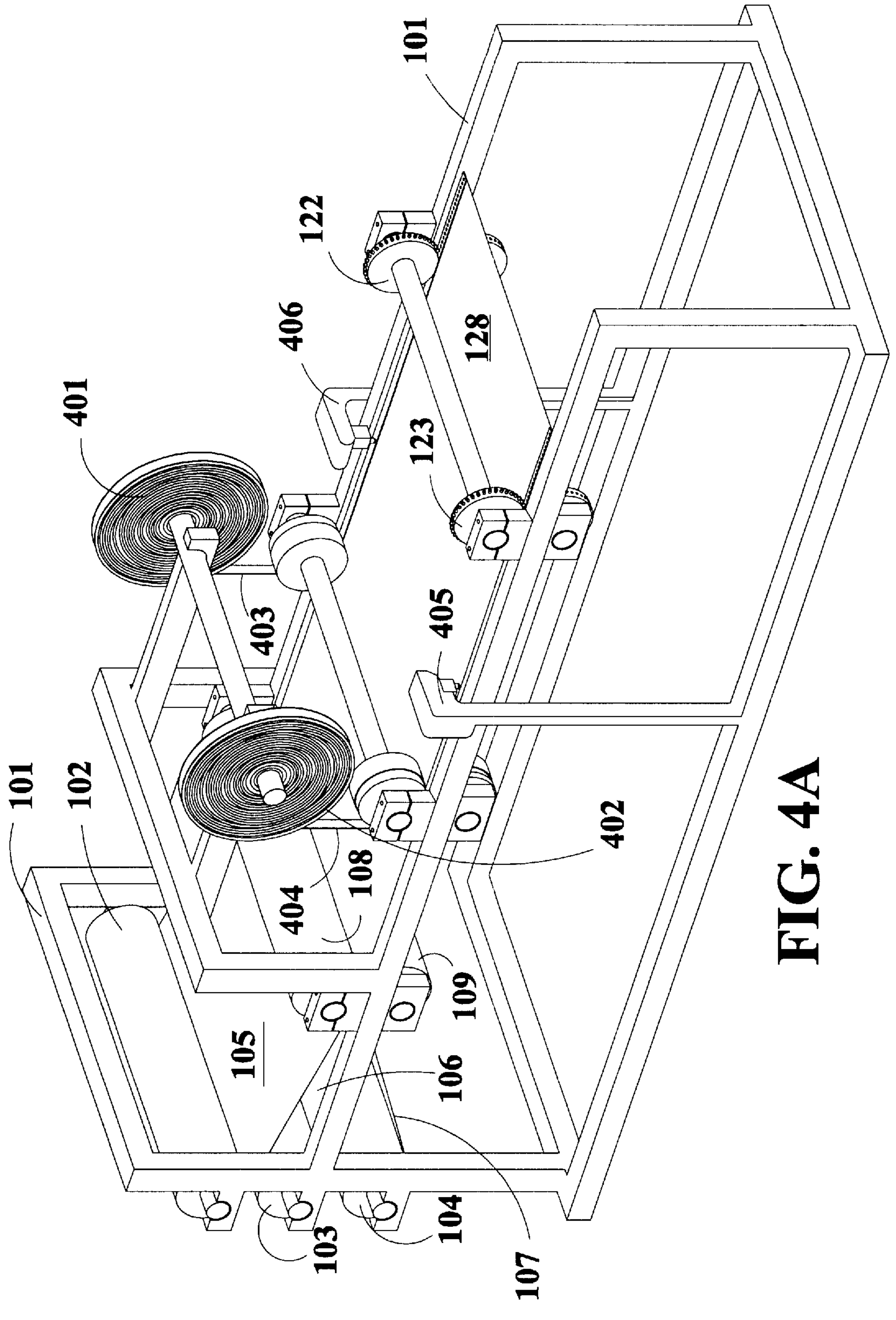
FIG. 4A is another embodiment of the invention illustrating ultrasonic welding of the strip to the edge of the curtain.
Figure 5:
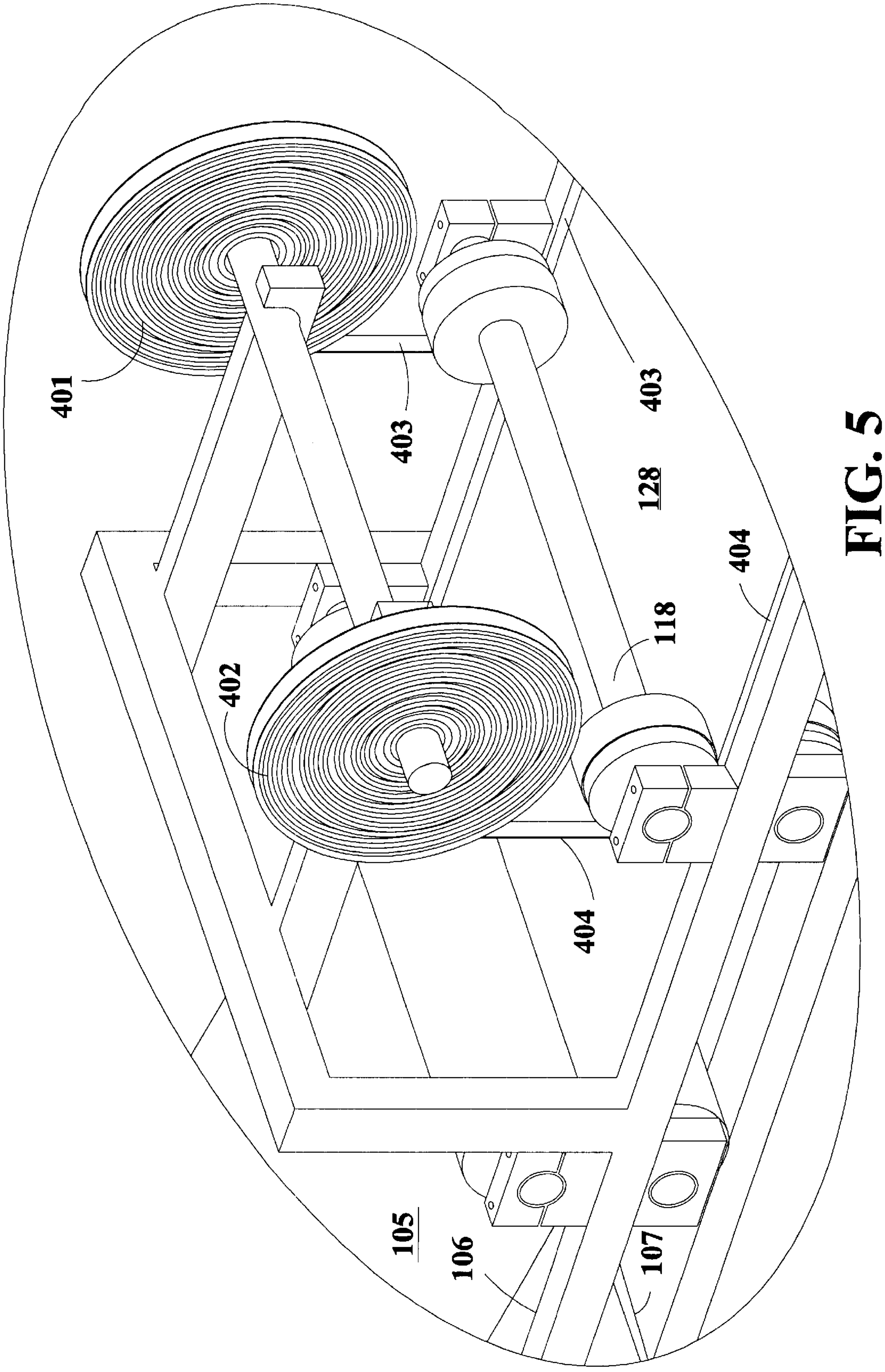
FIG. 5 is an enlargement of a portion of FIG. 4A.

FIG. 4 is another embodiment of the invention illustrating polymeric strips 403, 404 applied to the edges of the curtain. Polymeric strips 403, 404 are coiled up on a spindle 420 and are dispensed therefrom and laminated by edge rollers 118, 119. Additionally, the strips may be stitched with stitching apparatus 120, 121 (FIG. 4) or ultrasonically welded 405, 406 (FIG. 4A). FIG. 5 is an enlargement of a portion of FIGS. 4 and 4A and better illustrates the lamination of the strips 403, 404 to the three ply flexible curtain 128.

Figure 6:
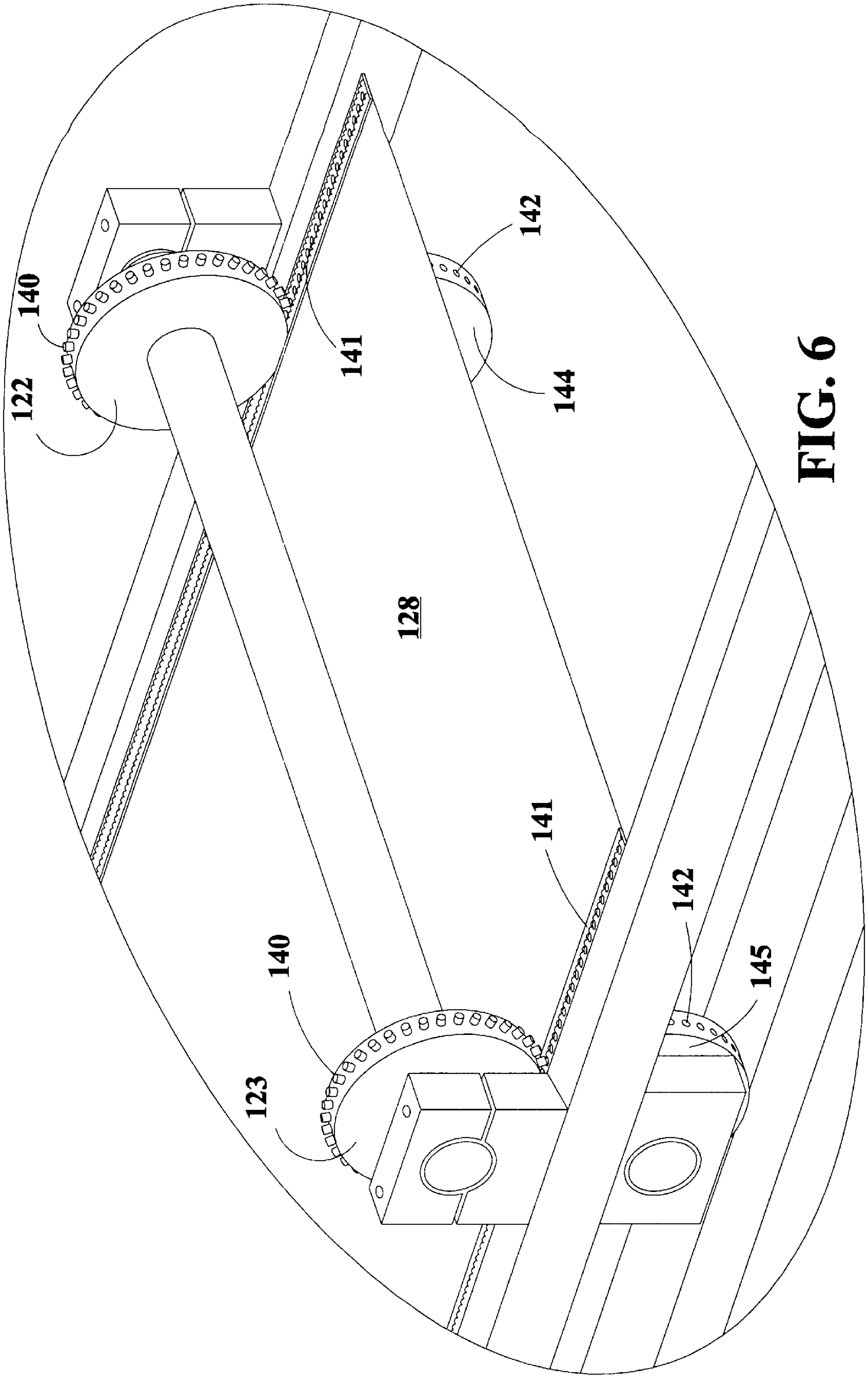
FIG. 6 is an enlargement of a portion of FIG. 1 illustrating a rotary punch and die for perforating the folded edges of the flexible curtain 128.
Figure 7:
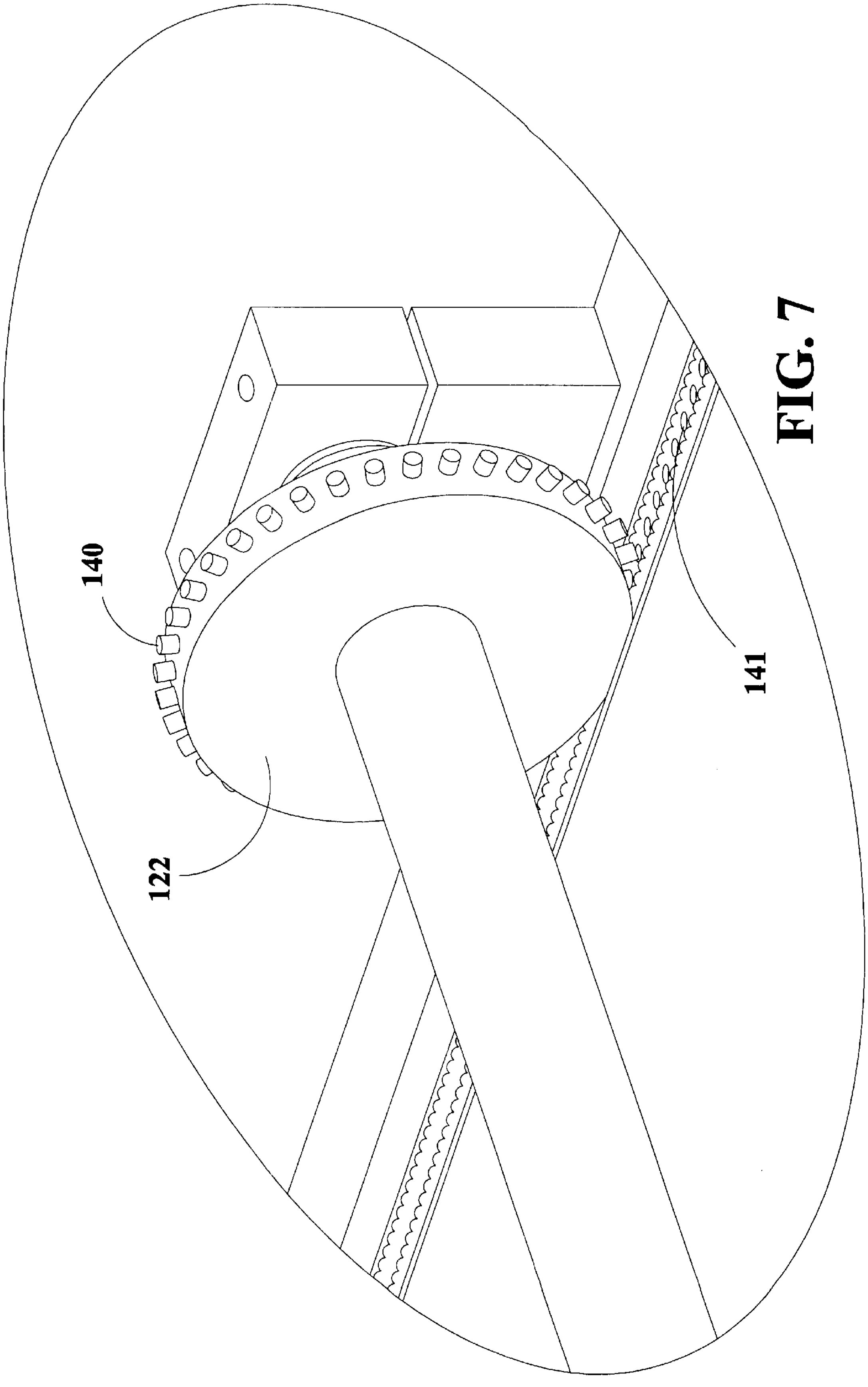
FIG. 7 is an enlargement of a portion of FIG. 6 better illustrating the perforations in the folded edges.

FIG. 6 is an enlargement of a portion of FIG. 1 and illustrates the first perforating rollers 122, 123 with protrusions 140 therein. Sometimes herein the perforating rollers to 122, 123 are referred to as rotary punches. Reciprocating rollers 144, 145 have apertures or dies 142 therein which receive the protrusions 140 together with the polymeric material which has been punched out. Protrusions 140 and dies 142 are preferably cylindrical but other shapes may be used. By punched out it is meant perforated as indicated by the perforations 141 in FIG. 7. FIG. 7 is an enlargement of a portion of FIG. 6. The punched out material exits the die through passageways (not shown in the drawings). The rotary dies can be driven by a motor if desired.

Figure 9:
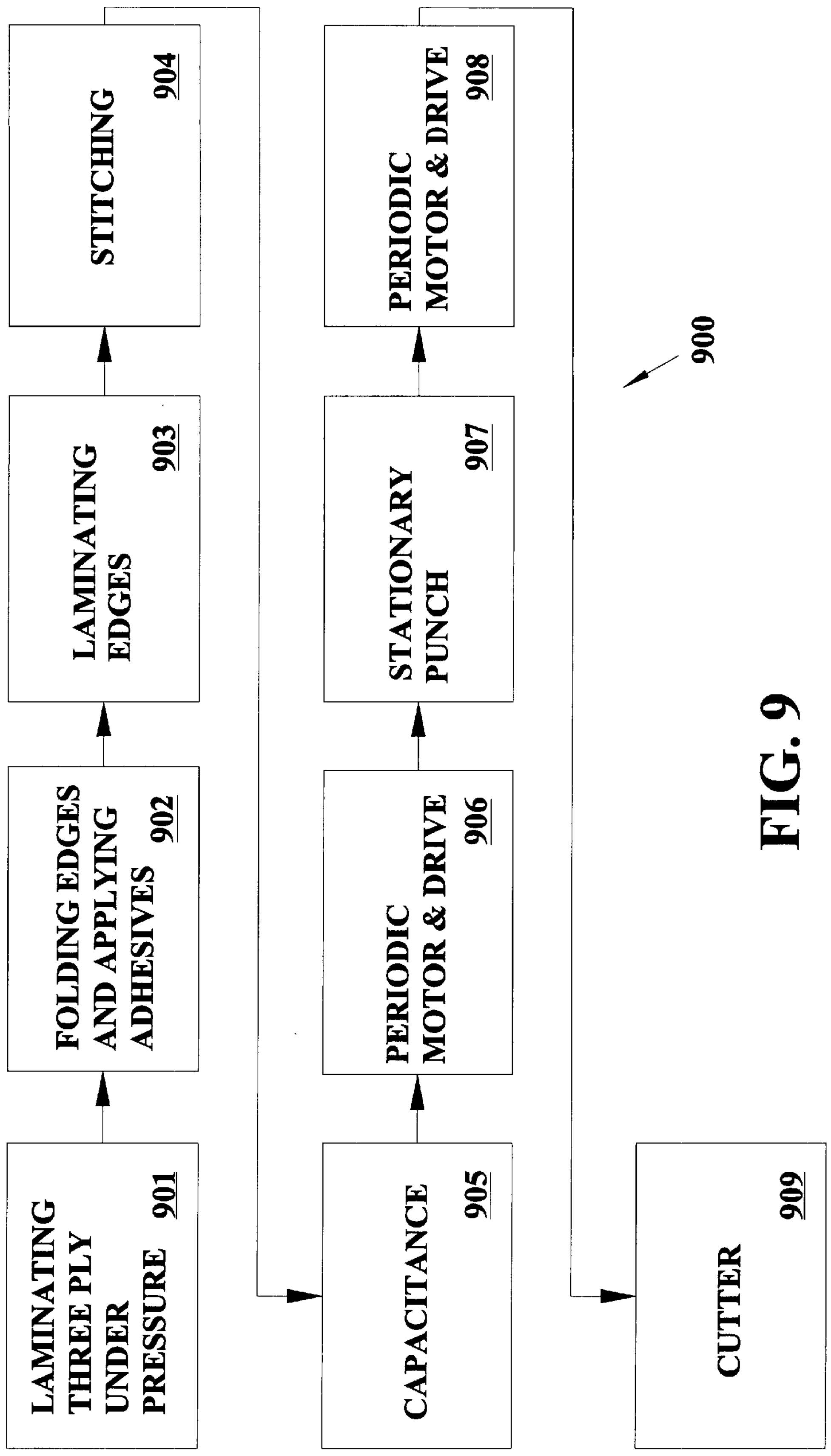
FIG. 9 is a flow chart of a stationary punching system.

Alternatively, the flexible curtain may be driven by a motor 906 and may include a capacitance station 905 if stationary punching is desired. See, FIG. 9, an embodiment of the invention set out in diagrammatic form and represented generally by the reference numeral 900. This embodiment discloses a drive system and a stationary punch. A three ply polymeric flexible curtain is laminated initially in the first step 901. Edges are folded and adhesive is applied in the next step 902. Those edges are laminated 903 and additionally may be stitched 904. A capacitance station 905, sometimes referred to herein as a surge station, may be used if a stationary punch is employed. A first periodic motor and drive 906 feeds the stationary punch 907. A second periodic motor and drive 908 is synchronized to the first periodic motor and drive 906 and feeds a cutter 909 which cuts the flexible curtain into usable lengths.

Figure 11:
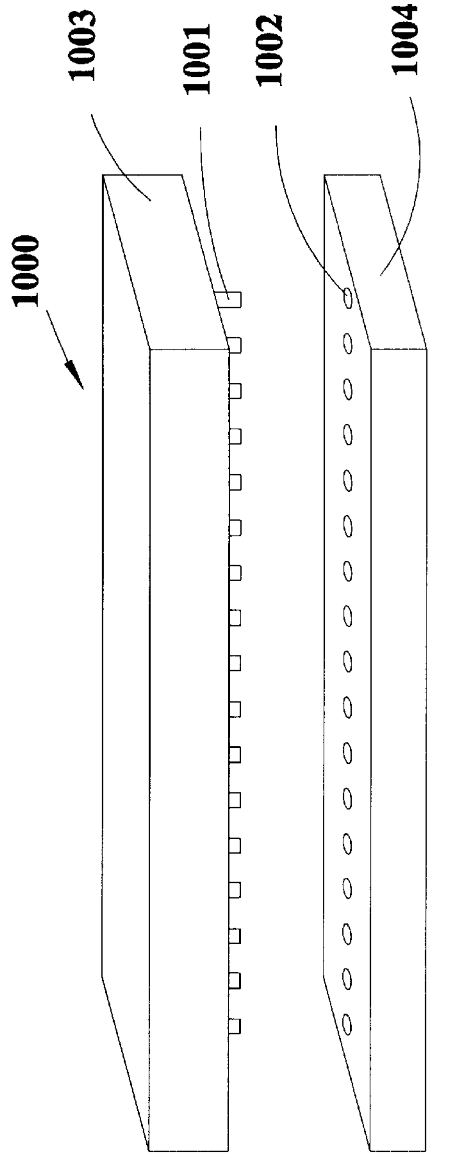
FIG. 11 illustrates the punch and die of FIG. 10 in perspective.
Figure 10:
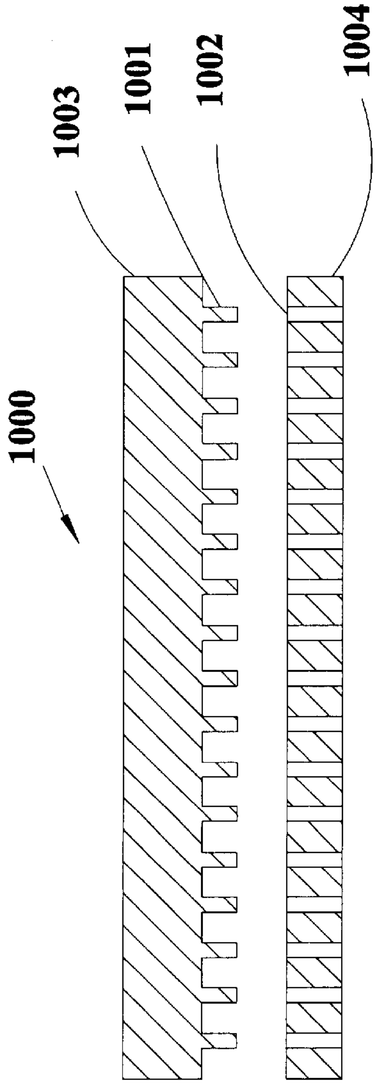
FIG. 10 illustrates a punch and a die in cross section.
Figure 12:
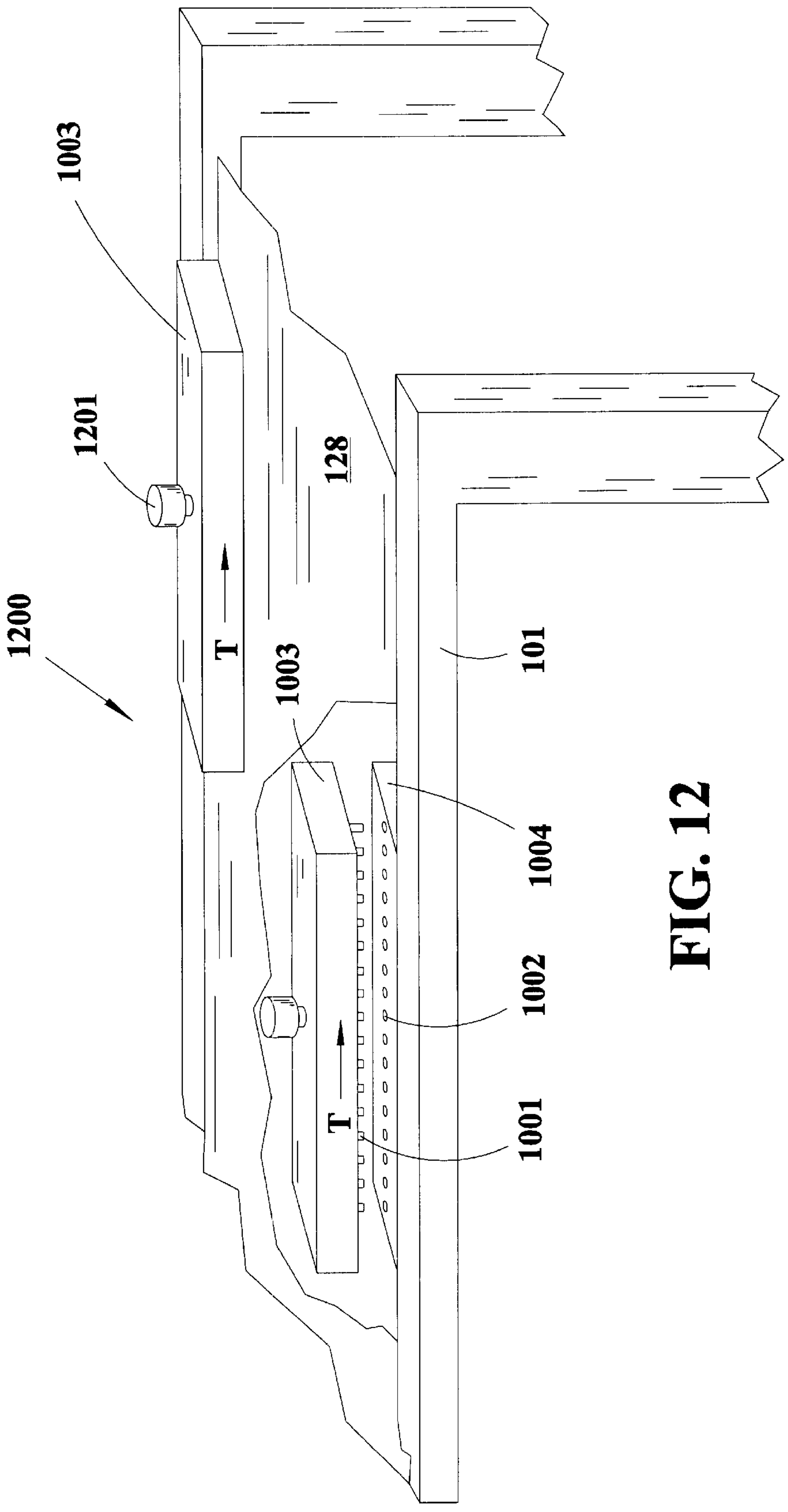
FIG. 12 is a perspective view of the punch and die shown together with the curtain.

The stationary punch 1000 is illustrated in FIGS. 10 and 11. FIG. 10 is a cross sectional view illustrating the die 1004 and the punch 1003 having projections 1001. Apertures 1002 accept the projections 1001 and may be of varied sizes and shapes. Punched out material exits the die 1004 at the bottom of the apertures 1002.

Reference numeral 1200 illustrates the punches 1003 and the dies 1004 in position. The punches and dies may be indexed as indicated by the letter T which stands for translational movement of the dies at the same speed of the curtain. Operator 1201 represents diagrammatically the structure necessary to drive the punch 1003 into the die 1004.

1t will be apparent to those skilled in the art that several changes may be made to the invention as disclosed herein without departing from the spirit and the scope of the appended claims.

We claim:

1. A flexible curtain making apparatus, said flexible curtain having edges and strips of polymeric material permanently laminated to each of said edges, comprising:

a first laminating edge roller;

a second laminating edge roller;

said second laminating edge roller includes notches therein; and, said first and second laminating edge rollers permanently laminate a portion of said strips of polymeric material to said edges of said flexible curtain leaving an inside remainder of each of said strips not laminated to said flexible curtain.

2. A flexible curtain making apparatus as claimed in claim 1 further comprising:

adhesive applicators for securing said strips of polymeric material to said edges of said curtain.

3. A flexible curtain making apparatus as claimed in claim 1 further comprising:

a stitching apparatus for securing said strips of polymeric material to said edges of said curtain.

4. A flexible curtain making apparatus as claimed in claim 1 further comprising:

an ultrasonic welding apparatus for securing said strips of polymeric material to said edges of said curtain.

5. A flexible curtain making apparatus as claimed in claim 1 further comprising:

a rotary punch and a rotary die.

6. A flexible curtain making apparatus as claimed in claim 1 further comprising:

a capacitance station for storing said curtain having polymeric strips secured to each of said edges; and, a stationary punch and die.

7. A flexible curtain making apparatus as claimed in claim 1 further comprising:

an indexing punch and die.

* * * * *

UNITED STATES PATENT AND TRADEMARK OFFICE

CERTIFICATE OF CORRECTION

PATENT NO. : 6,523,596 B1
DATED : February 25, 2003
INVENTOR(S) : Mullet et al.

It is certified that error appears in the above-identified patent and that said Letters Patent is hereby corrected as shown below:

Column 1,
Line 5, delete "FILED" and insert -- FIELD --.

Signed and Sealed this

Twenty-fourth Day of June, 2003

JAMES E. ROGAN
*Director of the United States Patent and Trademark Office*